Dec. 11, 1951 K. BOWERS ET AL 2,578,625
GLOSS METER
Filed July 3, 1948 4 Sheets-Sheet 1
FIG. I.
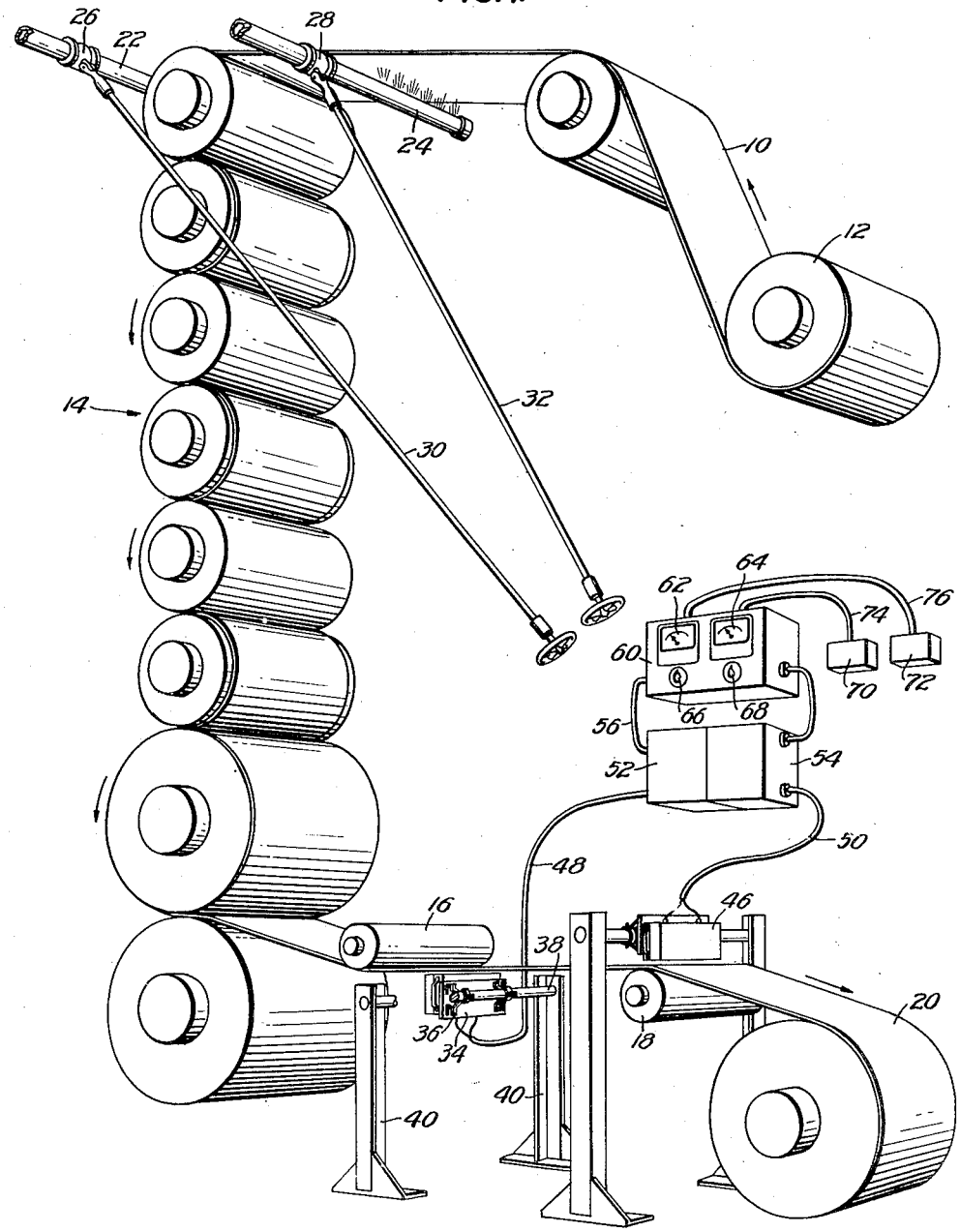
INVENTOR
KENNETH BOWERS AND
BY THOMAS E. MASON
Blair, Curtis & Hayward
ATTORNEYS

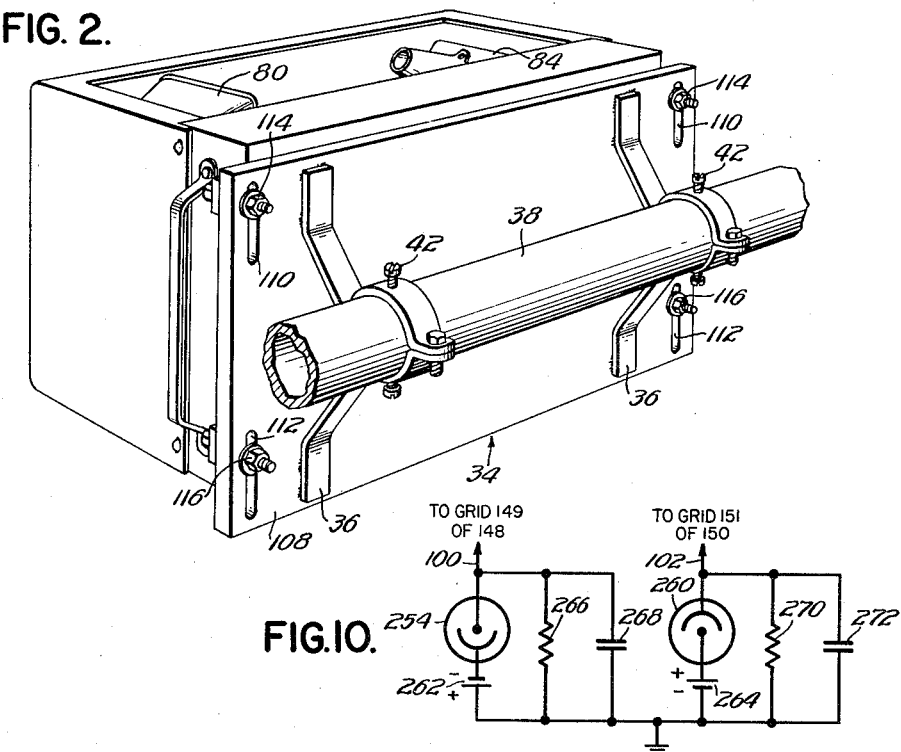
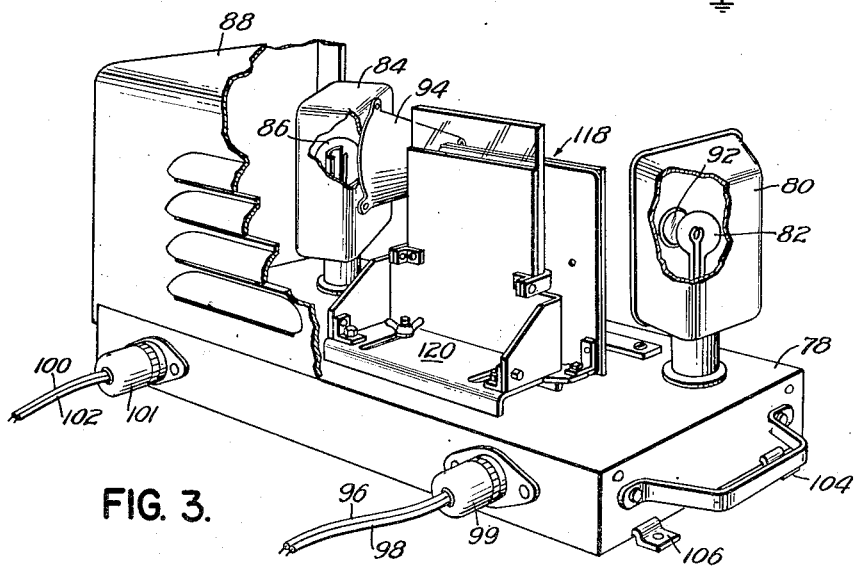

INVENTOR
KENNETH BOWERS AND
BY THOMAS E. MASON
ATTORNEYS

Dec. 11, 1951     K. BOWERS ET AL     2,578,625
GLOSS METER

Filed July 3, 1948     4 Sheets—Sheet 4

INVENTOR
KENNETH BOWERS
BY THOMAS E. MASON
Blair, Curtis & Hayward
ATTORNEYS

Patented Dec. 11, 1951

2,578,625

UNITED STATES PATENT OFFICE 2,578,625

GLOSSMETER

Kenneth Bowers, Hudson Falls, and Thomas E. Mason, Glens Falls, N. Y., assignors to Glens Falls Laboratory, Inc., Glens Falls, N. Y.

Application July 3, 1948, Serial No. 37,034

2 Claims. (Cl. 88—14)

This invention relates to surface gloss measurement and more particularly to apparatus for continuously measuring the gloss of a running paper web as it passes through the calender that imparts the gloss to the paper.

In the manufacture of many types of high quality paper it is customary in one of the final stages of manufacture to pass the paper through a series of calender rolls under a controlled pressure to impart a glossy finish to the paper. This calendering step of the paper making process is important since it improves the appearance and the smoothness of the paper and as well as other properties of the paper that determine its printing qualities. Since the effectiveness of the calendering operation can be determined by measuring the gloss of the paper web as it leaves the calender, a number of gloss meters have been previously proposed for this purpose, most of which provide for a static measurement of the gloss on a paper sample that has been cut from the running web. In one type of gloss meter that has previously been proposed, gloss is measured by causing a beam of light to impinge at an angle on the sheet of paper and measuring the amount of reflected light as a measure of gloss. In order to obtain a gloss measurement that is substantially independent of the color of the sheet, it is important that the angle of incidence of the light beam on the sheet be relatively large, i. e. of the order of 75° or more. The present apparatus is of this general type.

As indicated above, the methods of gloss measurement which have been most extensively used heretofore involve taking a sample from the running web and testing it statically, but these methods are subject to serious disadvantages, primarily because of the time which elapses before the measurement is completed. The paper web travels at a relatively high rate of speed and, during the period in which a static measurement is being taken, a considerable quantity of paper passes through the machine. Hence, if the static test indicates that some change in operating conditions should be made, the necessary adjustment cannot be made in time to avoid the production of a considerable quantity of off-grade paper. Also the gloss may vary across the width of the sheet, and in such cases a single sample is not likely to be representative of the web as a whole.

On the other hand, when an effort is made to measure gloss continuously, a number of special problems are encountered. Since the paper web is traveling at a high rate of speed the gloss measuring device must be rapidly responsive to changes in gloss. Also there is some tendency for the intensity of the light source to vary over a period of time and hence it is difficult to predetermine accurately the intensity of the light beam falling on the paper.

It is an object of the present invention to provide an improved glossmeter for measuring continuously the gloss of a running paper web. It is another object of the invention to provide a glossmeter of this character that is unusually rapid in its response to changes in gloss. It is still another object of the invention to provide a glossmeter including a light source and means whereby the intensity of the light source can be readily readjusted to a standard value without interfering with the operation of the paper machine and without removal of the glossmeter from its operative position with respect to the paper web. It is a further object of the invention to provide a glossmeter wherein the gloss of the paper may be continuously compared with a standard of known reflectivity. Other objects of the invention will be in part obvious and in part pointed out hereafter.

The many objects and advantages of the present invention may be best understood and appreciated by reference to the accompanying drawings which illustrate a glossmeter incorporating a preferred embodiment of the present invention and wherein:

Figure 1 is a perspective view of a supercalender with a gloss-responsive device embodying the present invention mounted adjacent to each side of the paper web as it leaves the supercalender. Figure 1 also indicates diagrammatically the manner in which the gloss-responsive devices are connected to their respective amplifiers and meters;

Figure 2 is an enlarged perspective view of one of the gloss-responsive devices of Figure 1, and shows in somewhat greater detail the means for mounting the device;

Figure 3 is a perspective view which is essentially a bottom view of the device of Figure 2 with the casing broken away to show the interior construction of the device;

Figure 5:
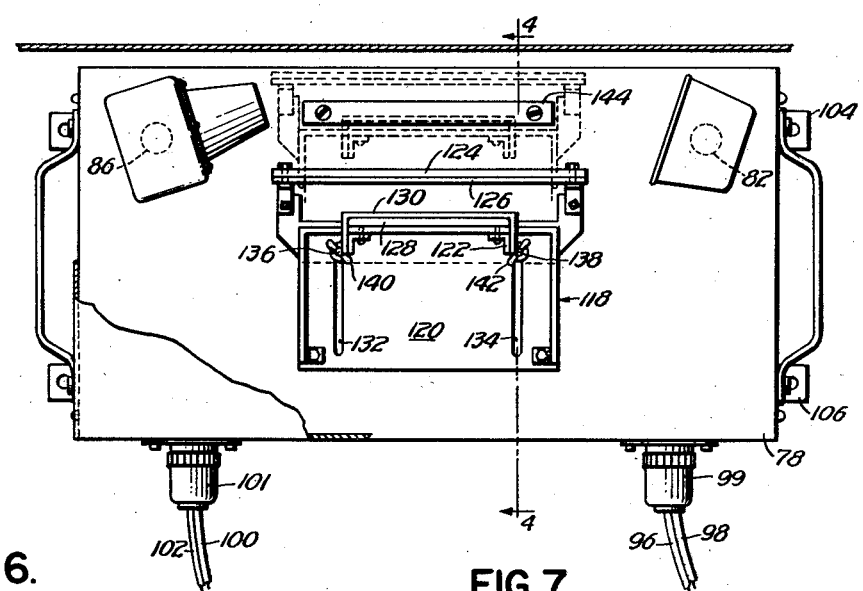
Figure 6:
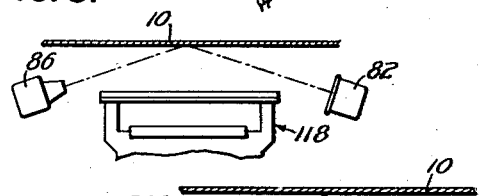
Figure 7:
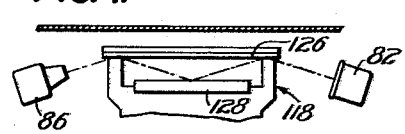
Figure 8:
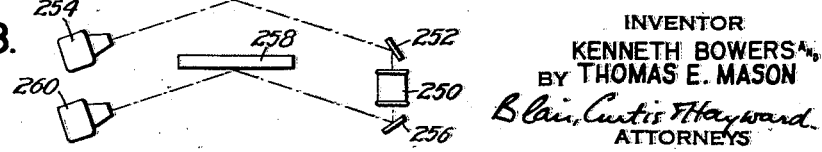
Figure 9:
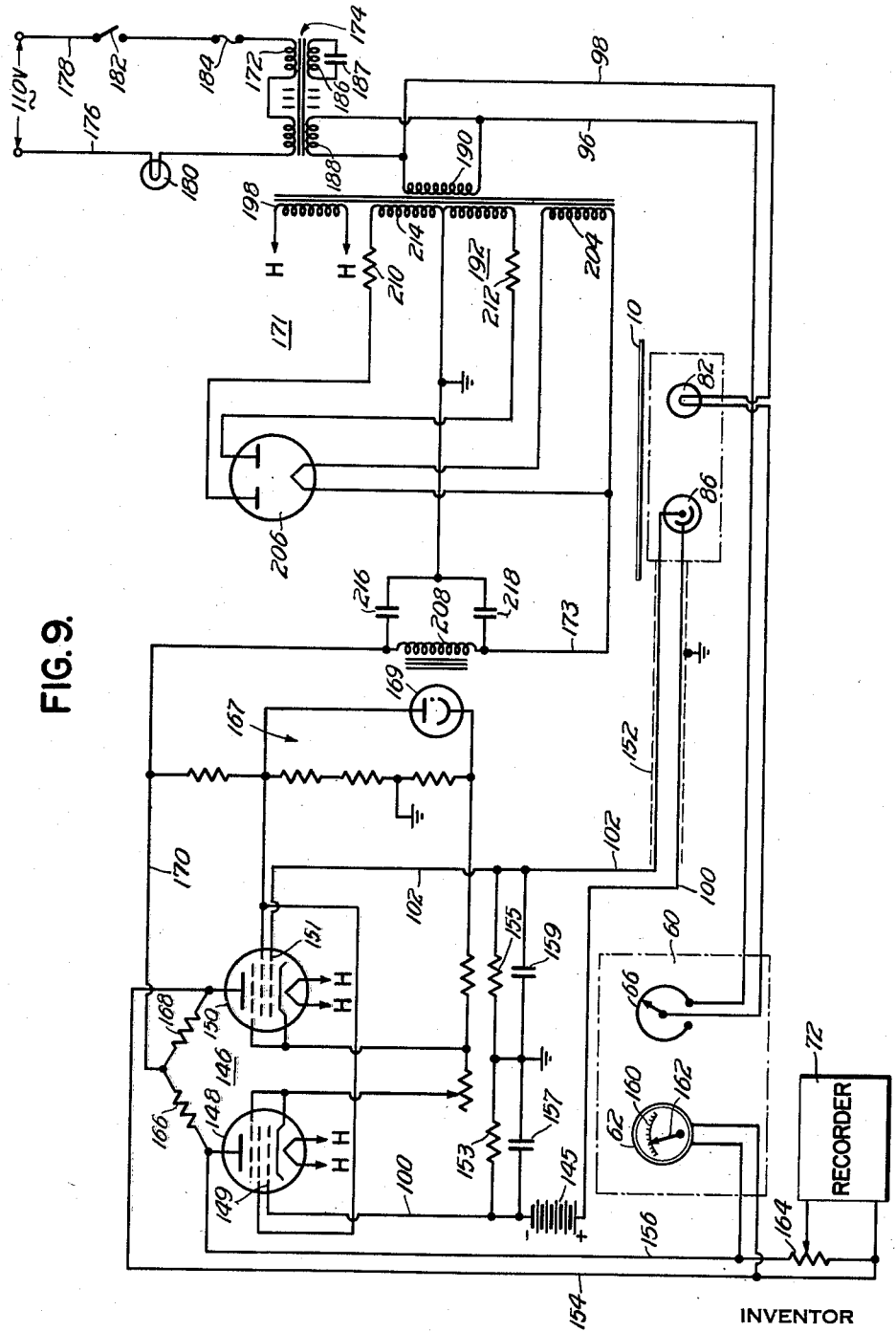

Figure 5, considered in relation to the device as shown in Figures 1 and 2, is a rear elevation of the interior of the responsive device, showing the arrangement of the light source housing and photocell housing with respect to the standardizing frame;

Figure 6 is a diagram showing the path of the light beam with the standardizing frame in non-operating position;

Figure 7 is a diagram showing the path of the light beam with the standardizing frame in standardizing position;

Figure 8 is a diagram showing a modified form of the device wherein the reflectivity of the web is continuously compared with the reflectivity of a standard;

Figure 9 is a wiring diagram showing the measuring and amplifying circuit and the manner in which the photocell and light source are connected therein; and Figure 10 is a wiring diagram indicating how the circuit of Figure 9 is modified when the embodiment of Figure 8 is used.

Referring to the drawings and more particularly to Figure 1, the paper web 10 is unwound from the feed roll 12 and passes downwardly around the rolls of super-calender 14, thereunder the guide roll 16 and over the guide roll 18 to the take-up roll 20. At the top of the calender stack a pair of spray pipes 22 and 24 are provided by means of which steam may be sprayed on the two sides of the paper web just before it enters the calender. The steam pipes 22 and 24 are provided respectively with the regulating valves 26 and 28 which are desirably provided with extension rods 30 and 32 extending down to the operating floor so that the valves may be conveniently operated to regulate the steam flow. The gloss of the paper may be varied by varying the steam flow through spray pipes 22 and 24 and hence valves 26 and 28 provide a means of adjusting the gloss value as the gloss is being measured by the apparatus now to be described.

Confronting the paper web opposite the guide roll 16 there is a gloss-responsive device 34 that is mounted by means of the clamps 36 on a horizontal bar 38 which is in turn supported in the standards 40. As best shown in Figure 2, the clamps 36 are provided with set screws 42 which normally hold the gloss-responsive device 34 in fixed position but may be unscrewed to permit the responsive device to be moved transversely to any desired position across the width of the web.

Reverting to Figure 1, a second gloss-responsive device 46 is positioned adjacent to the upper surface of the web 10 opposite the guide roll 18 and is supported similarly to the responsive device 34. The responsive devices 34 and 46 are connected by suitable cables 48 and 50 to the amplifiers 52 and 54 which are in turn connected by cables 56 and 58 to the meter box 60. The value of the gloss on the under side and upper side of the web are indicated on the dials 62 and 64, respectively, of meter box 60, and rheostats 66 and 68 are provided at the meter box 60 to permit standardizing of the instrument in a manner described hereafter.

The amplifiers 52 and 54 may be located in any suitable place where they are out of the way, while the meter box 60 preferably is located close to the lower ends of extension rods 30 and 32 for convenience of operation. If it is desired to record the value of the gloss, suitable recording devices 70 and 72, which may be, for example, potentiometer-recorders of conventional construction, are connected to the meter box 60 by the cables 74 and 76.

Figure 4:
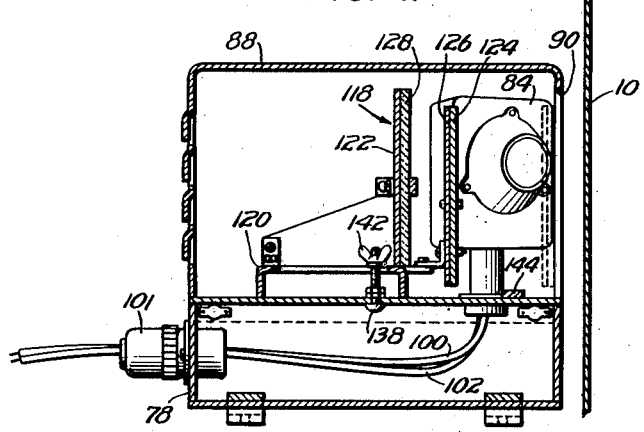
Figure 4 is a transverse section taken on the line 4—4 of Figure 5 and showing the photocell connections and the manner in which the standardizing frame is mounted.

The responsive devices 34 and 46 are of similar construction and hence only one need be described in detail. The internal construction of the responsive devices is best shown in Figures 3, 4 and 5 of the drawings. Referring to these figures, each of the responsive devices comprises a hollow base 78 on which there is mounted a housing 80 containing a light source such as the bulb 82, and a housing 84 containing a photocell 86 which preferably is of the vacuum type. The light source 82 and photocell 86 with their respective housings are enclosed in a casing 88 which (see Figure 4) is provided with an aperture 90 that confronts the paper web 10.

As indicated in the diagram of Figure 6, light from the source 82 is directed in a beam against the surface of the web 10 at an angle of incidence of about 75° and is reflected therefrom toward the photocell 86. Reverting to Figure 3, light from the source 82 is collimated into a beam by passing through a lens 92 in the housing 80 and, after reflection from the surface of the paper web 10, is collected by a frusto-conical collimating tube 94 and directed toward the cathode of photocell 86. The light source 82 is energized through the conductors 96 and 98 which pass through the hollow base 78 to the housing 80. Similarly the photocell 86 is connected into the measuring circuit (described hereafter) by means of conductors 100 and 102 which pass through the hollow base 78 to the housing 84. Plug-in type connections 99 and 101 are provided at the points where the conductors enter base 78 so that the responsive device may be readily disconnected from the rest of the circuit if desired.

The base 78 is provided with the lugs 104 and 106 by means of which the responsive device is supported on the pipe 38. Referring to Figure 2, the clamps 36 are secured to a vertical plate 108 having the slots 110 and 112 therein. The base 78 of the responsive device is bolted to the plate 108 by the bolts 114 and 116 that pass through the lugs 104 and 106, and the slots 110 and 112, respectively. The slotted construction of the plate 108 is such that the responsive device may be readily raised and lowered to the desired position with reference to the paper web.

As indicated above, there is a tendency for the intensity of the light source 82 to vary over a period of time. Hence it is necessary to standardize the device from time to time, and a standardizing device, generally designated as 118, is provided for this purpose. Referring to Figures 4 and 5, the standardizing device 118 comprises a platform 120 that rests against the base 78 and is slidable thereover, and a pair of vertical parallel frames 122 and 124 supported on the platform. Secured to the frame 124 is a mirror 126 which confronts a standardizing element 128 of standard reflectivity. The mirror 126 is a front surface reflecting type mirror in order to avoid the effects of refraction. The element 128 is held in place against the frame 122 by a retaining band 130 secured at its ends to the frame 122. This standardizing element 128 preferably is a piece of glass having a ground surface of uniform and predetermined reflectivity. Since it is slidably mounted between frame 122 and retaining band 130, it may be readily removed from the standardizing device for replacement by a standard having a different reflectivity value.

The standardizing device 118 is slidable into an operating position in which it intercepts the beam of light from source 82 and into a non-operating position in which it is out of the path of the beam. The standardizing position of the device is indicated in dotted lines in Figure 5 and the non-operating position in solid lines. Referring to Figures 4 and 5, the platform 120 is provided with slots 132 and 134 through which extend the bolts 136 and 138, respectively, that are secured to the base 78. At their upper ends the bolts 136 and 138 are threaded to receive the wing nuts 140 and 142, respectively. Thus these wing nuts may be loosened and the standardizing device moved into or out of the standardizing position.

Movement of standardizing device 118 toward the paper web 10 is limited by a stop 144 which serves to ensure proper positioning of the standardizing device with respect to web 10. Referring to Figure 7, when the device 118 is in standardizing position, light passes from the source 82 to the mirror 126 and then is reflected to the element 128, back to the mirror 126 and thence to the photocell 86. The standardizing position of the device 118 is such that the length of the path traversed by the light beam in Figure 7 is the same as the length of path in Figure 6 wherein the device 118 is withdrawn and the beam is reflected from web 10 to the photocell. The proper positioning of the device 118 to equalize the lengths of the beam paths is insured by the stop 144.

Referring now to Figure 9 which shows the measuring circuit of one of the gloss-responsive devices, the output of the photocell 86 is applied to a vacuum tube bridge circuit, generally designated by the numeral 146. The bridge 146 comprises a pair of pentode-type vacuum tubes 148 and 150 whose control grids 149 and 151 are connected by conductors 100 and 102, respectively, to the photocell 86. This photocell circuit includes a bias battery 145 connected in conductor 100 between grid 149 and photocell 86. A pair of resistors 153 and 155 connected in series between control grids 149 and 151, paralleled by a pair of condensers 157 and 159, respectively. The common connections of these resistors 153 and 155 and condensers 157 and 159 are interconnected and grounded as shown. The screen and suppressor grids of tubes 148 and 150 are connected in the usual manner to promote effective operation of the bridge circuit 146. The conductors 100 and 102 from the bridge circuit 146 to the photocell 86 are encased in a grounded shield 152.

The anodes of tubes 148 and 150 are connected through conductors 154 and 156 with the meter 62 provided with a reference scale 160 on which a pointer 162 indicates the degree of unbalance of bridge circuit 146 and hence the amount by which the gloss of the paper has departed from a desired value. As stated previously, if it is desired to record the measured value of the gloss a potentiometer recorder 72 may be used. The input voltage for the recorder 72 is taken off of a potentiometer 164 connected in parallel with the meter 62.

The bridge 146 comprises, in addition to tubes 148 and 150, two resistors 166 and 168 which are connected between the anodes of the tubes 148 and 150, respectively, and a conductor 170 through which the bridge is energized from a power supply section, generally indicated at 171. A voltage regulating circuit generally indicated at 167 and including a voltage regulator tube 169 is connected from the plate circuit conductor 170 to the cathode circuit of tubes 148 and 150.

This power supply section 171 is shown in the right hand portion of Figure 9. In order to insure stable operation of the instrument, a constant-voltage transformer 174 is used. The primary 172 of this constant-voltage transformer 174 receives energy from a suitable alternating current power source through the conductors 176 and 178. A pilot lamp 180 is provided in conductor 176, and a switch 182 and fuse 184 are provided in conductor 178. One secondary winding 186 of this transformer 174 is connected in series with a condenser 187. The other secondary winding 188 supplies power to the primary 190 of a power transformer 192. Secondary winding 188 also energizes the light source 82 through the conductors 96 and 98. The energizing circuit for light source 82 includes a rheostat 68, which, as previously described, is located at the meter box 60 to permit adjustment of the intensity of the light source 82.

The power supply section 171 is of the usual type. A secondary 198 of power transformer 192 is connected to the cathode heaters H—H of the tubes 148 and 150. Another secondary 204 of transformer 192 energizes the cathode of a rectifier tube 206. The anodes of rectifier tube 206 are connected through current limiting resistors 210 and 212 to the extremes of a high voltage secondary winding 214 of transformer 192, and the center tap of this secondary 214 is connected to ground. Energization of the bridge circuit 146 is supplied from this power supply circuit 171 by a conductor 173 connected from the cathode circuit of rectifier 206 through the usual power supply filter, formed of a choke coil 208 and two filter condensers 216 and 218, to the plate circuit conductor 170.

The operation of the above described apparatus should be largely apparent from the foregoing description. The gloss-responsive devices 34 and 46 are positioned adjacent to opposite sides of the running paper web with their apertures 90 located preferably about 1″ from the web. Considering the operation of device 34 as an example, a beam of light from the light source 82 passes through the lens 92, strikes the paper web 10 and is reflected to the phototube 86, resulting in the production of an electrical signal that is impressed upon the bridge circuit 146. The device 34 initially is so adjusted that the meter 62 reads zero for a desired value of gloss, i. e. the bridge is balanced. If the gloss thereafter departs from the desired value, the bridge is unbalanced and the pointer 162 of the meter 62 deflects to indicate this departure. The gloss-responsive device may be readily standardized by moving the standardizing device 118 to standardizing position and adjusting the rheostat 66 to bring the reading of meter 62 back to zero. The operation of responsive device 46 and its associated meter 64 and electrical circuit is similar to that of responsive device 34.

Referring now to Figure 8 of the drawings, this figure shows a modification of the gloss-responsive device wherein the reflectivity of the web is continuously compared with the reflectivity of a standard. A beam of light from the source 250 is reflected from a mirror 252 to the web 10 and then to a photocell 254. A second beam of light from source 250 is reflected from a mirror 256 to an element 258 having a standard reflectivity and then to the photocell 260. The mirror 256 and element 258 are so positioned with respect to web 10 that the length of path of the light beam is the same in passing from source 250 to photocell 254 and from source 256 to photocell 260.

The photocells 254 and 260 are connected into a vacuum tube bridge circuit, generally similar to that previously described, in such manner that the unbalance of the bridge causes the meter 62 to indicate the departure of the gloss of the paper web from the standard reflectivity value of element 258. To accomplish this, as shown in the partial circuit arrangement in Figure 10, the photocells 254 and 260 are connected in opposed relation. The cathode of photo-tube 254 is connected to ground through a battery 262, whereas the anode of photo-tube 260 is grounded through a battery 264. A resistor 266 and condenser 268 are connected in parallel across phototube 254 and battery 262, and, similarly, a resistor 270 and condenser 272 are connected in parallel across photo-tube 260 and battery 264. The anode of photo-tube 254 is connected by conductor 100 to the control grid 149 of tube 148 of Figure 9, and the cathode of photo-tube 260 is connected by conductor 102 to the control grid 151 of tube 150. In other respects the circuit for the embodiment of Figure 8 may be the same as that described in connection with Figure 9.

From the foregoing description it is apparent that the present apparatus is capable of achieving the several objectives set forth above. The use of a vacuum-type photocell with a circuit of the type described results in improved sensitivity and permits the use of a much lower intensity lamp as a light source, thereby prolonging lamp life and at the same time maintaining accurate readings. The device may be standardized and the accuracy of its readings checked very readily by means of the standardizing device 118 without interfering with the operation of the calender or removing the gloss-responsive device from its operating position. The reflectivity of the ground glass standard remains constant and does not vary as a paper standard would with changes in atmospheric conditions and as a result of aging. Thus the standardizing device of the present invention is unusually accurate and reliable, and comparison therewith may be effected either intermittently as indicated in Figures 6 and 7, or continuously as indicated in Figure 8.

Since many embodiments might be made of the present invention, and since many changes might be made in the embodiments disclosed herein, it is to be understood that the foregoing description is to be interpreted as illustrative only and not in a limiting sense.

We claim:

1. In apparatus for instantaneously measuring the gloss of one side of a running web of paper and continuously comparing this measurement with a similar measurement of the gloss of a given standard, comprising, in combination, a fixed supporting bar extending across said running web and spaced therefrom; a casing adjustably mounted on said supporting bar to permit transverse movement of said casing across said web and having an aperture confronting said web; a light source positioned within said casing; a first mirror positioned between said light source and said web and inclined at an angle of about $52\frac{1}{2}°$ to the plane of said web to direct a first beam of light from said source through said aperture to said web at an angle of incidence of about 75°; a first vacuum-type phototube mounted within said casing at approximately the same distance from said web as said first mirror to receive said first beam after it is reflected from said web; a gloss standard having a plane ground glass surface of predetermined, uniform gloss characteristic mounted within said casing parallel to the plane of said web; a second mirror within said casing positioned on the opposite side of said light source from said web and inclined at an angle of about $142\frac{1}{2}°$ to the plane of said web to direct a second beam of light from said source onto said gloss standard at an angle of incidence of about 75°; a second vacuum-type phototube mounted within said casing at approximately the same distance from said web as said second mirror for receiving the reflected beam from said gloss standard; electrical measuring means mounted at a point remote from said casing and web and adapted to receive and compare the electrical signals created by said beams impinging on said phototubes, said measuring means comprising a vacuum tube bridge circuit and indicating meter responsive to the degree of unbalance of said bridge to indicate deviation of the gloss characteristic of said web from said gloss standard; and flexible conductors interconnecting said phototubes and said bridge circuits.

2. An apparatus as described in claim 1 wherein the optical path from said source past said first mirror and said web to said first phototube is substantially equal to the optical path from said source past said second mirror and said gloss standard to said second phototube, and parallel thereto between said mirrors and said phototubes.

KENNETH BOWERS.
THOMAS E. MASON.

REFERENCES CITED

The following references are of record in the file of this patent:

UNITED STATES PATENTS

| Number | Name | Date |
|---|---|---|
| 1,816,047 | Keufel | July 28, 1931 |
| 1,971,317 | Sheldon et al. | Aug. 21, 1934 |
| 2,127,477 | Carpenter et al. | Aug. 16, 1938 |
| 2,312,310 | Bradner et al. | Mar. 2, 1943 |
| 2,415,177 | Hurley | Feb. 4, 1947 |